United States Patent

[11] 3,634,612

[72] Inventor Walter Marshall Stobbe
Morrisville, Pa.
[21] Appl. No. 895
[22] Filed Jan. 6, 1970
[45] Patented Jan. 11, 1972
[73] Assignee RCA Corporation

[54] IDENTIFIER CIRCUITS FOR COLOR BAR TYPE TEST GENERATORS
7 Claims, 2 Drawing Figs.

[52] U.S. Cl. .................. 178/5.4 TE
[51] Int. Cl. .................. H04n 9/12
[50] Field of Search .................. 178/54 TE

[56] References Cited
UNITED STATES PATENTS
2,943,144 6/1960 Wlasuk .................. 178/5.4
3,493,673 2/1970 Hartwich .................. 178/5.4

*Primary Examiner*—Richard Murray
*Assistant Examiner*—P. M. Pecori
*Attorney*—Eugene M. Whitacre

ABSTRACT: A color-bar-type test apparatus provides a signal which is processed by color television receiver to provide a plurality of different colored vertical bars on the face of the picture tube.

Figure 1:
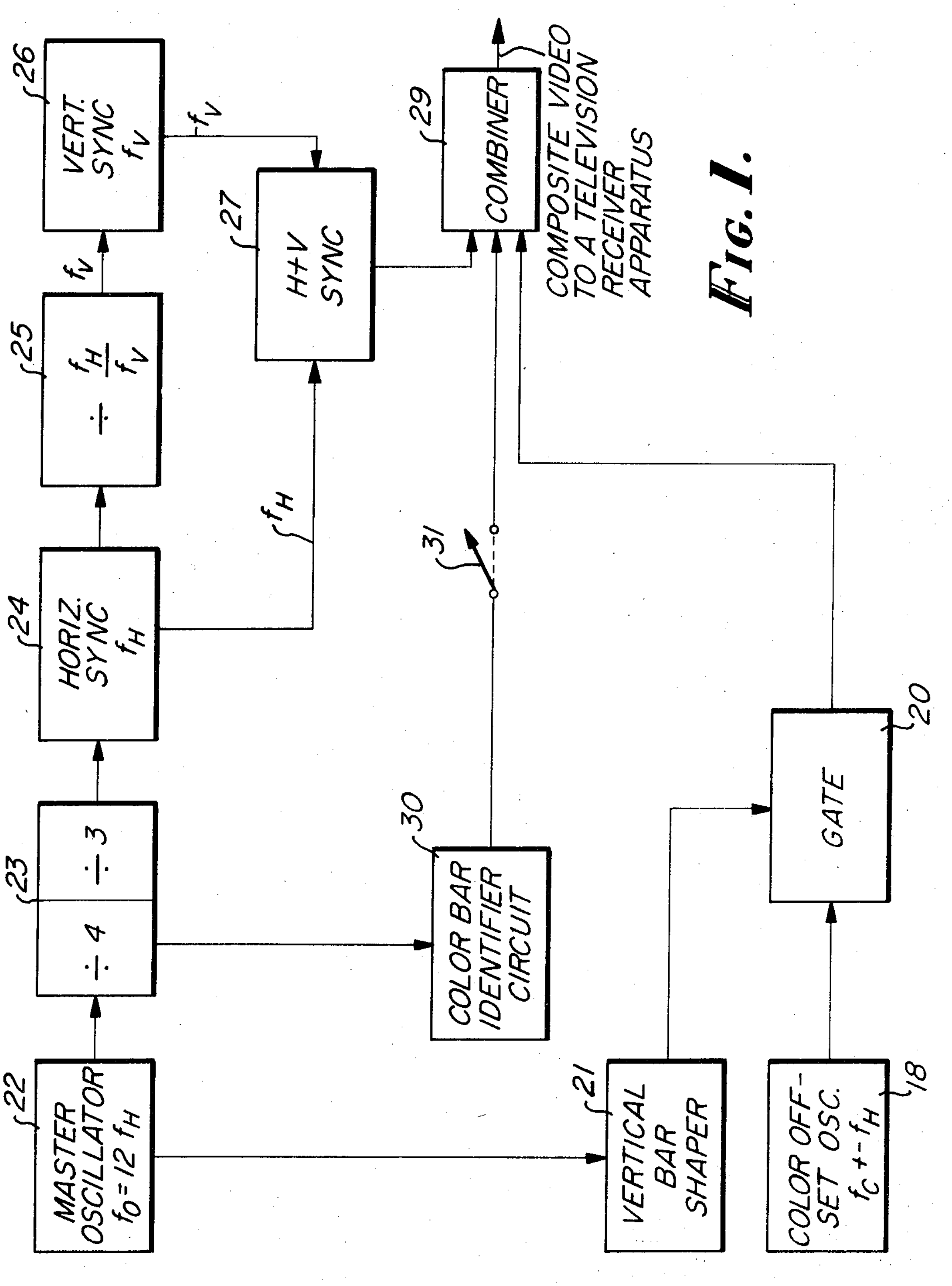

The signal as provided by the test apparatus, comprises a series of pulses each one of which is coincident with one or more of a plurality of burst signals which are developed to provide the color information representative of the vertical bars. These pulses serve to affect the amplitude of the video signal to cause that vertical bar associated with the burst to be displayed at a different brightness level on the kinescope display.

INVENTOR
Walter M. Stobbe
BY
ATTORNEY

INVENTOR
Walter M. Stobbe
BY
ATTORNEY

IDENTIFIER CIRCUITS FOR COLOR-BAR-TYPE TEST GENERATORS

This invention relates to apparatus for use in testing color television systems and more particularly to color bar generators.

The prior testing apparatus for color television receivers includes means for generating a number of differently colored vertical bars on the face of a color television display means. Such apparatus is useful for checking or adjusting the reproduction capabilities of the color television receiver. An example of such an apparatus as presently utilized, may be found by referring to U.S. Pat. No. 2,975,229, entitled "-Television Test Apparatus," issued on Mar. 14, 1961, to Stephen Wlasuk and assigned to the same assignee as the present application.

In order to optimumly adjust the response of a color television receiver, the service technician must know which of the plurality of vertical color bars represents a particular color. For example, in a typical color bar generator, the color of each vertical bar differs in phase from the preceding color bar by an amount corresponding to a 30° displacement of the chroma signal. The first bar seen on the screen of the tube is displaced 30° from color sync reference phase. Accordingly, the fourth bar has a 120° phase relation from the color sync reference signal and is commonly referred to as magenta, which is a combination of red plus the addition of some blue. In a similar manner the eighth visible color bar with a 240° phase relation is commonly referred to as cyan and as such is a blue and green combination color. Hence the technician or service man when setting up the color response of the receiver will count to the fourth bar or the eighth and make adjustments so that these bars will reproduce magenta and cyan respectively.

If the television receiver is overscanned in the horizontal direction, the first bar may never be displayed on the screen of the picture tube. Therefore, when the technician counts four he is actually looking at the succeeding or the fifth bar instead of the magenta bar; and when he counts eight he again is actually looking at the ninth color bar. Due to the nature of such bar generators, the fifth and ninth visible bars are relatively close in color to the fourth and eighth but not close enough to substitute for the same for proper receiver adjustment. Therefore, when the service man tries to utilize a color bar generator to check the response of an overscanned color television receiver, he may actually set the color response incorrectly, because one or more of the color bars may be hidden due to the overscan.

It is therefore an object of this invention to provide an improved color bar generator employing an identifying circuit for accurately indicating the position and therefore the phase of a displayed color bar.

According to the present invention, apparatus is provided for indicating one or more of a plurality of differently colored vertical bars on the face of a color television display means at a different brightness level than any of the other bars of said display.

The apparatus inserts a series of pulses into a composite video signal provided by the test apparatus. The inserted pulses having a repetition rate which is greater than the horizontal line rate and each pulse is coincident with the leading edge of one or more of a plurality of burst signals of different phase produced by said generator for developing the different colored vertical bars.

The inserted pulses serve to affect the amplitude of the video signal to cause that vertical bar associated with that burst phase to be displayed at a different brightness level on a kinescope display.

Figure 2:
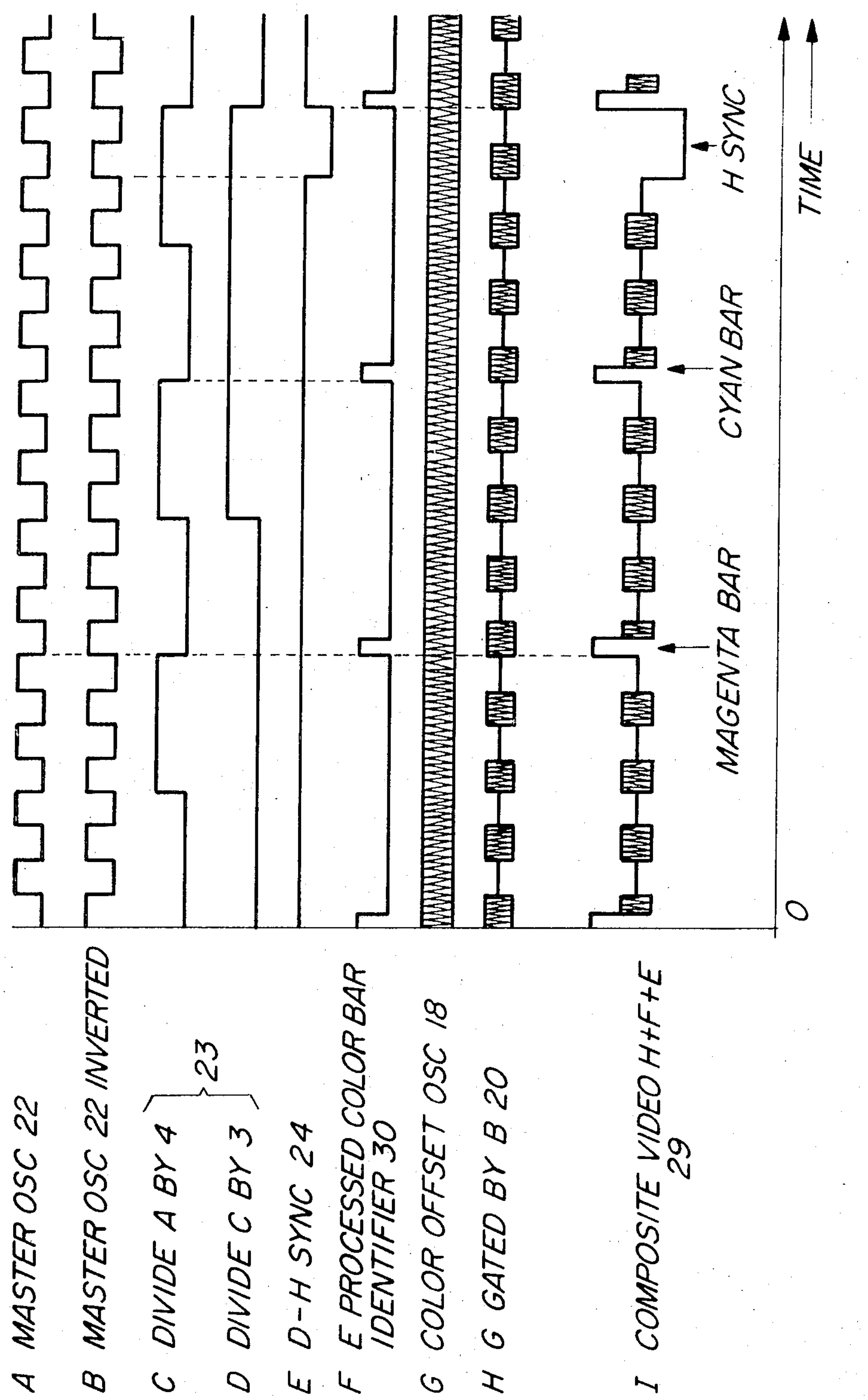

Reference is made to the following specification and the accompanying drawing in which:

FIG. 1 is a block diagram of a color bar test apparatus according to this invention; and FIG. 2 is a series of timing diagrams useful in explaining the operation of the apparatus shown in FIG. 1.

Referring to FIG. 1, there is shown a block diagram of a color bar test generator for a color television receiver.

Full details of color bar generators without the color bar identifier circuit to be described herein are incorporated in "RCA Color Bar Generator—TYPE WR–61B sold by Radio Corporation of America, Test & Measuring Equipment, Harrison, N. J. (1956)."

As oscillator 18 is crystal controlled and generates a signal of a frequency offset from the color subcarrier frequency by an amount equal to plus or minus a multiple of the horizontal line frequency $f_H$. This signal is applied to one input of a gate circuit 20.

A master oscillator 22 generates a waveform having a frequency equal to the twelfth multiple of the horizontal line frequency $f_H$. This signal, which is approximately 189 Hz. is applied to a vertical bar shaper circuit 21, which serves to shape the signal before application to a second input of the gate circuit 20. The shaped 189 Hz. signal serves to gate or key the offset subcarrier signal to provide at the output of gate 20, a series of bursts of the offset subcarrier frequency with a repetition rate determined by the frequency of oscillator 22. The output of oscillator 22 is also applied to a divider 23 consisting of a divide by four stage in cascade with a divide by three stage. The cascaded division factor of 12 provides at the output of the divider 23 a frequency approximately equal to the horizontal line frequency $f_H$ for use as horizontal sync.

The horizontal sync signal is further filtered and processed by the horizontal sync circuit 24. The output of circuit 24 is applied to a divider circuit 25 which performs a division by a factor equal to $f_H/fV$ to provide at the output thereof a signal having a frequency $fV$, which is the vertical sync frequency. The signal $fV$ is further filtered and processed by circuit 26.

The horizontal and vertical sync frequencies are combined in circuit 27 to provide the video sync signal This combined sync signal is applied to one input of a combiner circuit 29, having another input coupled to the output of the gate 20.

The output of the combiner 29 is therefore a composite video signal containing sync information and color information which is the offset subcarrier frequency as keyed by the raster oscillator 22 during the horizontal line interval.

A further circuit designated as the color bar identifier circuit 30 has an input coupled to the divide by four counter of divider 23 and serves to shape this signal before application thereto to the combiner circuit 29 via a switch 31.

When the switch 31 is in the dashed-line position a predetermined magnitude pulse is added to the composite signal before the magenta and cyan color producing burst signals to cause these signals to appear at a higher brightness level on the face of a color kinescope incorporated in a color television apparatus to be tested, and as will be further explained subsequently.

Essentially, the composite video signal provided at the output of the combiner 29 may be impressed as modulation on a carrier frequency for application to the antenna terminals of a typical color receiver; or may be applied directly to the video amplifier channel. The color receiver will process this signal to provide a series of color bars on the face of the kinescope.

If reference is made to the waveshapes of FIG. 2, the operation of the circuitry shown in FIG. 1 will be explained in greater detail.

FIGS. 2A and 2B show the outputs of the oscillator 22. The waveforms shown are 180° out of phase with each other and represent, for example, the two outputs of an astable crystal controlled multivibrator. This uninverted oscillator waveform of FIG. 2A is applied to the divider circuit 23. The divider 23 may be conventional bistable multivibrator counting chains employing two bistable circuits to perform the division by four and two more with a suitable feedback or other scheme to divide by three. FIG. 2C shows the output waveform of the divide by four circuit and FIG. 2D shows the output waveform of the divide by three circuit. The total division afforded with respect to the master oscillator signal is 12.

The horizontal sync pulse waveform shown in FIG. 2E is obtained by a suitable gating arrangement energized from the various waveforms produced by the counter divider stages incorporated in circuit 23, and processed in circuit 24.

The waveshapes of FIG. 2F shows the signal at the output of the color bar identifier circuit 30 which can also be conveniently provided in a number of ways. For instance, one would obtain the waveshapes of FIG. 2F, by differentiating the waveshape shown in FIG. 2C and removing the positive pulses by means of a rectifier and then amplifying and inverting the negative pulses. The same result can be provided by utilizing a monostable multivibrator which is triggered by the negative going transitions of the waveshapes shown in FIG. 2C.

FIG. 2G shows the sinusoidal waveshape provided by the subcarrier offset oscillator 18 of FIG. 1.

FIG. 2H shows the output of Gate 20. Essentially gate 20 performs an "AND" function. As shown in FIG. 1, one input of the gate is from the subcarrier offset oscillator 18 and the other from the master oscillator 20. When the master oscillator goes positive, the subcarrier frequency signal is passed by the gate, thereby providing at its output the waveshape shown in FIG. 2H.

As can be seen from FIG. 2H, there are 12 bursts within the period from $t=o$ to the end of the horizontal sync pulse of FIG. 2E. Each burst, as gated, has a phase shift which differs from the preceding one by 30° (i.e., 12 bursts determine a 360° phase interval) because of the offset of the subcarrier oscillator by the horizontal line frequency $fH$.

FIG. 2I shows the waveform of the composite video signal provided at the output of the combiner circuit 29 of FIG. 1, with switch 31 in the dashed line position.

The pulse waveshape shown in FIG. 2F is added as explained, to the composite burst and sync signal and appears on the leading edge of the first, fifth and ninth burst signals. However, the first bar is the one directly following horizontal sync and is the color reference oscillator synchronizing signal. This signal is gated out in a typical receiver during the horizontal retrace interval and is used to "lock" the receiver subcarrier oscillator. This signal is not visible on the face of the kinescope because the kinescope is being blanked during this time. Therefore, the second burst signal is the first actual visible bar and the fifth burst is the fourth visible bar (Magenta) and the ninth burst is the eighth visible bar (Cyan). There is also no visible signal on the face of the kinescope for the 12 burst, as this is blanked by the horizontal sync pulse. Hence the color bar display produced by the composite signal shown in FIG. 2I consists of 10 visible color bars.

When switch 31 of FIG. 1 is placed in the dashed-line position, the fourth and eighth bars are identified immediately to the technician as they will appear on the face of the kinescope at a higher brightness level than all other bars because of the magnitude of the pulses of FIG. 2F.

Therefore, if a receiver is overscanning the technician still knows which of the displayed bars is magenta and which is cyan.

Although the horizontal frequency $fH$ and the master oscillator frequency were referred to in terms of the television standards for color, it is well known, that the actual frequencies selected in such a test generator may differ slightly from conventional standards depending upon the type of display to be presented or the particular type of pattern desired. For example, in such test equipments one instrument may provide a Color Bar display, a Cross Hatch display and a Dot display depending on the position of a display selector switch. In order to meet the conditions for the three types of displays, the frequency $fH$ may be selected to differ from the actual horizontal line rate by a given number of cycles.

Examples of such actual frequencies and relationship are described in greater detail in the above-noted reference entitled "RCA Color Bar Generator—TYPE WR-61B."

What is claimed is:

1. In a color bar test generator of the type adapted to produce a test signal which is to be displayed as a plurality of bars of different color on the face of a picture tube of a color television receiver, said test signal being generated to provide said plurality of bars in accordance with a synchronizing pulse of a predetermined rate associated with a television display, the combination including:

a. means for providing an indicator signal of a predetermined time relation with respect to said synchronizing pulse to occur during a portion of said test signal representative of one of said color bars, and b. means responsive to said indicator signal for combining the same with said test signal for causing that portion of said test signal corresponding to said color bar to differ from the remainder of said test signal corresponding to other bars in a manner to illuminate said color bar differently on the face of said picture tube.

2. In a color television test apparatus of the type employing an oscillator operating at a frequency equal to the color subcarrier frequency offset by a frequency approximately equal to the horizontal line frequency, and having an output coupled to a gating circuit, which is gated on and off by a master oscillator signal having a repetition rate approximately equal to $n$ times said horizontal line rate, where $n$ is a positive integer above one, to provide at an output thereof a series of burst signals differing in phase from one another during one horizontal line, said generator including a translating circuit to translate said master oscillator frequency by said factor of $n$ to produce horizontal sync and combining means for adding said sync to said burst signal to provide at an output a composite video signal which upon application to color television receiver circuits produces on the face of a kinescope included in said receiver, a series of vertical bars each of a color determined in accordance with the phase of said bursts, in combination therewith, apparatus for indicating the phase of said bursts by effecting the brightness of a preselected number of said vertical bars, comprising, a. first means coupled to said translating circuit to provide a second series of signals having a repetition rate which is a submultiple of said master oscillator signal, and b. means coupling said first means to said combining means for adding said second series of signals to said composite signal to accurately indicate any selected number of said series of bursts, whereby said vertical bars associated with said selected number of series of bursts is illuminated differently on said face of said kinescope from any other burst not so indicated.

3. In a color bar generator of the type employing an oscillator operating at a frequency equal to the color subcarrier frequency offset by the horizontal line frequency, and having an output coupled to a gating circuit, which is gated on and off by a master oscillator signal having a repetition rate approximately equal to 12 times said horizontal line rate, to provide at an output thereof a series of burst signals differing in phase from one another by approximately 30° during one horizontal line, said generator including a divider circuit to divide said master oscillator frequency by a factor of 12 to produce horizontal sync and combining means for adding said sync to said burst signal to provide at an output a composite video signal which upon application to color television receiver circuits produces a series of vertical bars each of a color in accordance with the phase of said bursts on the face of a kinescope employed therein, in combination therewith, the improvement comprising, a. first means coupled to said divider to provide a second series of signals having a repetition rate which is a submultiple of said master oscillator signal and greater than said horizontal line rate, b. means coupling said first means to said combining means for superimposing said second series of pulses on said composite signal to accurately indicate a preselected number of said series of bursts included in said composite signal, to cause said vertical bars related to said preselected bursts to appear at a different brightness level in accordance with the magnitude of said second series of pulses.

4. The combination according to claim 3 wherein said first means coupled to said divider provides a series of pulses having a repetition rate equal to four times said horizontal line rate.

5. Color television test apparatus comprising, a. a first oscillator for producing pulses having a first repetition rate, b. a divider coupled to said oscillator for providing pulses at an output thereof having a second repetition rate which is a given submultiple of said first, c. a second oscillator for providing a signal having a given frequency, d. a coincidence circuit, e. first means for applying said signal from said second oscillator to said coincidence circuit, f. second means for applying said pulses of said first repetition rate to said coincidence circuit to provide at an output thereof said second oscillator signal when one of said pulses is present at said coincidence circuit, g. third means coupled to said divider responsive to said signal at said second repetition rate to provide a third series of pulses having a pulse width less than that of said first and second pulses and occurring in time coincidence with the leading edge of every one of said first pulses occurring at said given submultiple, h. a combining circuit coupled to said coincidence circuit and responsive to said third pulses to provide at an output the signal from said coincidence circuit plus said third series of pulses superimposed thereon.

6. The color television test apparatus according to claim 5, wherein a. said divider coupled to said oscillator operates to provide pulses having a second repetition rate which is one-fourth said first repetition rate.

7. Test apparatus for a color receiver for providing a composite video signal including a predetermined number of time intervals and containing information including horizontal and vertical synchronizing components, and video components, which signal upon application to a color television receiver causes a color bar pattern to be displayed on the face of a kinescope included therein, comprising, a. a master oscillator operating at a given first frequency, selected according to said predetermined number of time intervals, b. a reference oscillator operating at a frequency approximately equal to the color subcarrier reference frequency offset by said horizontal synchronizing rate, c. a coincidence circuit having first and second input terminals and an output terminal, said first input terminal coupled to said reference oscillator and said second input terminal coupled to said master oscillator for providing a series of bursts at the output thereof each one occurring during one of said predetermined number of time intervals, d. first means coupled to said master oscillator for dividing said frequency to provide a plurality of frequencies one of which is approximately equal to said horizontal synchronizing rate and one of which is equal to said vertical synchronizing rate, e. a combining circuit having one input coupled to the output of said coincidence circuit and another input coupled to said first means for providing said composite video signal and, f. second means for selectively coupling said combining circuit to said first means, said second means being responsive to one of said divided frequencies for applying the same to said combining means to cause a selected number of said bursts occurring during said predetermined intervals to be accurately indicated.

* * * * *

UNITED STATES PATENT OFFICE

CERTIFICATE OF CORRECTION

Patent No. 3,634,612 Dated January 11, 1972

Inventor(s) Walter Marshall Stobbe

It is certified that error appears in the above-identified patent and that said Letters Patent are hereby corrected as shown below:

Column 2, line 6, that portion reading "As" should read -- An --; line 13, that portion reading "Hz" should read -- kHz --; line 16, that portion reading "Hz" should read -- KHz --; line 32, after "signal" insert -- . -- .

Signed and sealed this 28th day of November 1972.

(SEAL)
Attest:

EDWARD M.FLETCHER,JR.
Attesting Officer

ROBERT GOTTSCHALK
Commissioner of Patents